Patented Nov. 16, 1943

2,334,195

UNITED STATES PATENT OFFICE 2,334,195

PROCESS FOR THE PRODUCTION OF POLYMERIZATION PRODUCTS

Heinrich Hopff and Siebert Goebel, Ludwigshafen-on-the-Rhine, Germany, assignors, by mesne assignments, to General Aniline & Film Corporation, New York, N. Y., a corporation of Delaware No Drawing. Application March 6, 1940, Serial No. 322,547. In Germany March 14, 1939

5 Claims. (Cl. 260—80)

The present invention relates to a process for the production of polymerization products.

The copending application Ser. No. 309,238, filed December 14, 1939, by the present inventors and Curt W. Rautentrauch, describes a process for the production of polymerization products in which ethylene, if desired in admixture with other polymerizable compounds, is subjected to polymerization in an aqueous emulsion in the presence of substances supplying oxygen.

We have now found that ethylene may be converted into solid or semi-solid polymerization products in a very simple manner by effecting its polymerization in the presence of organic solvents and oxygen or substances supplying oxygen. The organic solvents may be used either alone or in combination with aqueous liquids in which the solvents and the ethylene are emulsified or dissolved. By our new method of working the solid polymerization products may be obtained under relatively low superatmospheric pressures. Comparatively small proportions of organic solvents, say from 10 to 100 per cent (percentage by weight with reference to ethylene) are sufficient for obtaining good yields of solid polymerization products at between about 100 and about 300 atmospheres, whereas considerably higher pressures are required when conducting the process in the absence of organic solvents.

Among the substances having an accelerating effect in the polymerization we may mention oxygen or substances supplying oxygen, especially peroxidic substances, for example persulphates, percarbonates, perborates as well as benzoylperoxide, peracetic acid, diacetylperoxide, toluic acid peroxide and oleic peroxide which are obtainable from the acid chlorides by means of hydrogen peroxide and caustic soda solution.

As suitable organic solvents we may mention by way of example benzene, toluene, xylene and halogenated hydrocarbons, such as ethylene chloride, carbon tetrachloride and chlorbenzene.

Interpolymerization products may be produced by treating ethylene together with further unsaturated substances which in their turn are capable of polymerization under the conditions employed, i. e. substances capable of polymerizing alone under the conditions concerned and substances which polymerize only when exposed to the polymerizing conditions in conjunction with substances polymerizable by themselves. Among substances polymerizable by themselves we may mention by way of example propylene, isobutylene, butadiene, styrene and acrylic acid esters; compounds not polymerizable by themselves but in conjunction with polymerizable substances are for example maleic acid diethyl ester and dimethyl ester. By varying the proportions of the components employed, the properties of the polymerization products may be varied considerably.

The polymerization products are suitable for a great variety of applications. They may be worked as plastics by injection-moulding or used for coating electrical conductors or for the manufacture of condensers. When dissolved in organic solvents they may be used for the preparation of coatings resistant to acids and alkalies.

The following examples serve to illustrate how our present invention may be carried out in practice, but the invention is not restricted to the said examples. The parts are by weight.

*Example 1*

100 parts of liquid ethylene, 100 parts of benzene and 2 parts of benzoyl peroxide are heated in a pressure vessel at from 80 to 100° C. After a short time the initial pressure of 100 atmospheres falls to about 70 atmospheres. After removing any unpolymerized ethylene and distilling off the solvent, the polymerization product is left behind in the form of a white waxy mass melting above 100° which may be purified by redissolving from organic solvents.

When using toluene instead of benzene a valuable polymerization product is likewise obtained.

If trichlorethylene is employed instead of benzene an interpolymerization product containing chlorine is obtained having similar properties.

*Example 2*

250 parts of benzene and 500 parts of ethylene are emulsified in a pressure vessel in 1000 parts of an aqueous solution containing 20 parts of the sodium salt of alpha-hydroxyoctodecane sulphonic acid, 1.5 parts of potassium persulphate, 7.5 parts of hydrogen peroxide and 10 parts of benzoyl peroxide and polymerized under a pressure of 150 atmospheres at between 100° and 110° C. After 2 hours the emulsion is precipitated by the addition of an electrolyte, such as common salt. A white powder is obtained having a melting point of above 100° C.

*Example 3*

100 parts of ethylene, 200 parts of methanol and 2 parts of benzoylperoxide are mixed in a pressure resisting vessel provided with a stirring device and heated to from 110° to 120° C. for 2 hours. The pressure, being 80 atmospheres at the outset, rises to 160 atmospheres and falls to 40 atmospheres when the mass is cooled. Any unpolymerized ethylene having been blown off, a suspension of finely pulverized polyethylene in methanol is obtained. The polyethylene, after being filtered off by suction and dried, melts at between 105° and 108° C.

In the process described above the methanol may be replaced by an equal proportion of butanol. The polymerization then proceeds at between 100° and 110° C. at a sufficient speed.

Example 4

100 parts of ethylene, 150 parts of water, 50 parts of butanol and 2 parts of benzoyl peroxide are heated at from 100 to 110° C. in a pressure vessel for 4 hours while stirring. A suspension of polyethylene in butanol is thus obtained. By filtering by suction and drying finely pulverized polyethylene is obtained which melts at between 100° and 103° C.

Example 5

100 parts of ethylene, 200 parts of methanol and 3 parts of hydrogen peroxide are heated at from 90° to 100° C. in a pressure vessel for 6 hours while stirring. A finely pulverized polyethylene is obtained.

Example 6

100 parts of ethylene, 100 parts of methanol, 100 parts of water and 3 parts of potassium persulphate are heated at from 120° to 130° C. in a pressure vessel for 5 hours while stirring. Besides high-melting solid polyethylene there are obtained semi-solid polymerization products which melt at between about 60° and 80° C.

Example 7

100 parts of ethylene, 150 parts of methanol and 1 part of oxygen are heated in a pressure-tight vessel at from 170 to 180° C. for 10 hours. A finely pulverized polyethylene is thus obtained which melts between 102 and 107° C.

Example 8

100 parts of ethylene, 80 parts of benzene, 10 parts of dichlorethylene and 4 parts of oleic peroxide are heated in the course of 3 hours up to 85 to 95° C. in a pressure vessel provided with a stirring device; stirring is continued for 5 hours at the same temperature. By working up in a manner analogous to that described in Example 3 a fine powder is obtained from which foils may be readily obtained by rolling.

Example 9

100 parts of ethylene, 80 parts of methanol, 10 parts of isobutylene and 4 parts of benzoyl peroxide are heated together in a pressure vessel provided with a stirring device; heating up to 95 to 100° C. is effected in the course of 3 hours and stirring is continued for another 10 hours at the same temperature. By working up as described in Example 3 a solid interpolymerisate is obtained which contains some oily constituents.

Example 10

100 parts of ethylene, 80 parts of methanol, 25 parts of styrene and 2 parts of benzoyl peroxide are heated in the course of 8 hours up to 100° C. in a pressure vessel provided with a stirring device; stirring is continued for 2 hours at this temperature. The reaction mixture is then heated in the course of 3 hours up to 170° C. at which temperature stirring is continued for another 2 hours. By working up as described in Example 3, an interpolymerisate is obtained containing 20 per cent of polystryrene; foils may be readily obtained therefrom according to known methods.

Example 11

100 parts of ethylene, 150 parts of methanol, 25 parts of acrylic acid ethyl ester and 6 parts of hydrogen peroxide are heated together up to 55° to 65° C. in the course of 6 hours in a pressure vessel provided with a stirring device; stirring is continued for 8 hours at this temperature. The reaction product which is obtained after working up is a thermoplastic material containing 10 per cent of ethylene in interpolymerized form.

What we claim is:

1. A process for the production of from semi-solid to solid polymerization products which consists in subjecting ethylene in admixture with a further unsaturated compound, capable of copolymerizing with ethylene under the reaction conditions, the unsaturation of said compound being attributable to double bonds, to copolymerization in the liquid phase at a temperature of about 55° to 180° C. and a pressure of about 100 to 300 atmospheres in the presence of an inert organic solvent and as a polymerization catalyst a substance selected from the class consisting of oxygen and substances supplying oxygen under the reaction conditions.

2. The process for the production of from semi-solid to solid polymerization products from ethylene which comprises subjecting ethylene in the liquid phase to a temperature of about 55 to 180° C. under a pressure of about 100 to 300 atmospheres in the presence of an inert organic solvent and as a polymerization catalyst a substance selected from the class consisting of oxygen and substances supplying oxygen under the reaction conditions.

3. The process as defined in claim 2 wherein the polymerization catalyst is a peroxide.

4. The process as defined in claim 2 wherein the inert solvent is a benzene hydrocarbon.

5. The process as defined in claim 2 wherein the inert solvent is a chlorinated aliphatic hydrocarbon containing not more than two carbon atoms.

HEINRICH HOPFF.
SIEBERT GOEBEL.